(12) United States Patent
Garay et al.

(10) Patent No.: US 7,023,998 B2
(45) Date of Patent: Apr. 4, 2006

(54) CRYPTOGRAPHIC KEY PROCESSING AND STORAGE

(75) Inventors: Juan A. Garay, West New York, NJ (US); Bjorn M. Jakobsson, Hoboken, NJ (US); David M. Kristol, Summit, NJ (US); Semyon B. Mizikovsky, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 898 days.

(21) Appl. No.: 09/823,042

(22) Filed: Mar. 30, 2001

(65) Prior Publication Data

US 2002/0141589 A1 Oct. 3, 2002

(51) Int. Cl.
*H04L 9/00* (2006.01)

(52) U.S. Cl. ................. 380/277; 455/73; 455/410; 711/163

(58) Field of Classification Search ........... 380/277, 380/283, 285; 709/223; 235/380; 455/73, 455/410; 705/71; 711/163
See application file for complete search history.

(56) References Cited

U.S. PATENT DOCUMENTS

| | | | | |
|---|---|---|---|---|
| 5,644,354 A * | 7/1997 | Thompson et al. | ........ | 725/138 |
| 5,745,571 A * | 4/1998 | Zuk | ........ | 380/285 |
| 6,018,581 A * | 1/2000 | Shona et al. | ........ | 380/46 |
| 6,055,314 A * | 4/2000 | Spies et al. | ........ | 380/228 |
| 6,167,514 A * | 12/2000 | Matsui et al. | ........ | 713/150 |
| 6,385,723 B1 * | 5/2002 | Richards | ........ | 713/160 |
| 6,493,824 B1 * | 12/2002 | Novoa et al. | ........ | 713/162 |
| 6,510,518 B1 * | 1/2003 | Jaffe et al. | ........ | 713/168 |
| 6,584,199 B1 * | 6/2003 | Kim et al. | ........ | 380/203 |
| 6,810,479 B1 * | 10/2004 | Barlow et al. | ........ | 713/185 |
| 2004/0205344 A1 * | 10/2004 | Otway et al. | ........ | 713/169 |

* cited by examiner

*Primary Examiner*—Matthew Smithers
*Assistant Examiner*—Minh Dieu Nguyen

(57) ABSTRACT

A method and apparatus enhancing the security of an encrypted cryptographic key by storing its key re-transforming information in a decryption store that is separate from a cryptographic key store, which stores the encrypted cryptographic key, from which accessing circuitry is able to access the encrypted cryptographic key. The cryptographic key store may be a disk drive of a computer, the decryption store may be a network access card installed in that computer or a mobile terminal coupled to that computer, and the accessing circuitry may be the computer's controller. Decryption of the encrypted cryptographic key is carried out in the decryption store, as is the subsequent encryption or decryption using the decrypted cryptographic key. The accessing circuitry communicates with the decryption store exclusively via a predetermined interface, where the interface does not allow the accessing circuitry access to the cryptographic key and to at least a portion of the key re-transforming information from the decryption store. Thus, the encrypted cryptographic key can be stored relatively insecurely; while the security of the cryptographic key is maintained at a very high level because there is no native capability for the computer to randomly read information from the network access card or the mobile terminal.

44 Claims, 6 Drawing Sheets

CRYPTOGRAPHIC KEY PROCESSING AND STORAGE

BACKGROUND OF THE INVENTION

This invention relates to systems that use cryptographic keys.

Security of communications in, for example, computer and communication networks can be achieved by encrypting the communications using a cryptographic key. Typical applications include communications to and from personal computers, mobile telephones, or other user equipment.

It is advantageous for the cryptographic key to be stored and maintained within the equipment. In this way, encryption and decryption can proceed in a way that is transparent to the user in that the user does not have to know the cryptographic key and be required to input it into the equipment prior to initiating communications. Rather, encryption and decryption can all be done automatically by the equipment.

Storing and maintaining the cryptographic key in the equipment has other advantages, as well. For example, when it is desired to revoke a corporate employee's permission to use the corporate communications network (such as when the employee leaves the employ of the company) all that needs to be done is to retrieve from the employee's possession whatever equipment the employee may have been issued in which the cryptographic key was stored—a company-supplied network access card, for example, or to remove the key from such equipment. Similarly, the cryptographic key necessary to decrypt premium cable channel signals can be stored in the cable access box, so that discontinuation of the cable subscriber's access to such programming is readily achieved by removing the box from the subscriber premises.

A further advantage arises from the fact that in many systems the same cryptographic key is used for communications to and from many users. Thus if the cryptographic key was not stored in the equipment but, rather, was in the direct possession of the users, terminating a particular user's ability to utilize the network would require that a new cryptographic key be issued to all the other users—an inconvenient and potentially expensive proposition. Having the cryptographic key within equipment that can be recovered from an individual user is clearly a more advantageous approach in that regard.

The approach is not foolproof, however. The manner in which the cryptographic key is stored in the user's equipment may be such that a sufficiently knowledgeable and/or motivated user might be able to learn what the cryptographic key is. For example, the cryptographic key might simply be stored in a file on the hard drive of a personal computer. Such user would then be in a position to use the cryptographic key in the future even if the equipment in question was taken away from him. It might be possible to store the cryptographic key in a less user-accessible place within the computer, e.g., within a network access card. However, a device like that is easily removable from the rest of the user's equipment and is portable. As such, it is easy to make off with, even at a moment's notice. Moreover, having the cryptographic key stored in such a user-inaccessible location as the network access card may thwart the desire of the network operator to be able to readily distribute cryptographic keys to a multiplicity of users by, for example, loading of the cryptographic key by a network administrator, and having that cryptographic key stored on the computer's hard drive.

Advantageously, a more secure approach is to store the cryptographic key within the user equipment in encrypted form. In order for the cryptographic key to be usable for communications, then, it would first have to be decrypted by the equipment. Thus even if a user is able to locate the cryptographic key within the equipment, it does him no good because the cryptographic key is encrypted and cannot be used until decrypted.

Even this approach has a weakness, however, in that the information/algorithm needed to decrypt the cryptographic key must be stored somewhere within the user's equipment so that the cryptographic key can be decrypted when needed. Admittedly, it is more difficult for a user to have to discover not only the (now encrypted) cryptographic key but also the key decryption information and to know how to use the latter to recover the original cryptographic key. However, a sufficiently knowledgeable and motivated user might be able to do just that. Or the user might simply be able to monitor internal operations of the equipment in such a way as to "pick off" the original cryptographic key once it has been decrypted and is in use within the system.

SUMMARY OF THE INVENTION

We have therefore recognized that there is a need to protect against unauthorized decryption of the encrypted cryptographic key(s).

In accordance with the invention, security of the cryptographic key is enhanced beyond that provided by arrangements such as those described above by storing key re-transforming information, for example the decryption information, in a device, referred to herein as a "decryption store" which is separate from, i.e. communicates via a predetermined interface with, the device in which the transformed cryptographic key, such as the encrypted cryptographic key, is stored. The latter device is referred to herein as an "cryptographic key store." The system containing the decryption store and the cryptographic key store also contains accessing circuitry that is able to access the encrypted cryptographic key from the cryptographic key store. The cryptographic key store may be, for example, a disk drive of a computer, the decryption store may be, for example, a network access card installed in that computer, and the accessing circuitry may be, for example, the computer's controller. Decryption of the encrypted cryptographic key is carried out in the decryption store, as is the subsequent encryption or decryption using the decrypted cryptographic key. The accessing circuitry communicates with the decryption store exclusively via the interface. The accessing circuitry and decryption store communicate by transferring information back and forth. However, the interface is such that the accessing circuitry is unable to access from the decryption store at least one of: a) at least a portion of the key re-transforming information, and b) at least a portion of the unencrypted cryptographic key. Preferably the accessing circuitry is unable to access either of them. In the above example, then, the encrypted cryptographic key can be stored relatively insecurely on the computer disk drive—thereby allowing it to be readily changed—while the security of the cryptographic key itself is maintained at a very high level because there is no native capability for the computer to randomly read information from the network access card. It can only read information from the card via the interface pursuant to the hardware and software design of the card. Thus absent a physical disassembly and reverse-engineering of the decryption store, it will be extraordinarily difficult for someone seeking to know the cryptographic key to discover the key decrypting algorithm and associated data or to read the decrypted cryptographic key from the decryption store during the actual encryption process. Moreover, even if the encrypted cryptographic key is duplicated and shared with another (unauthorized) user, it cannot be used without a physical possession of the decryption store devise.

DETAILED DESCRIPTION

Figure 1:
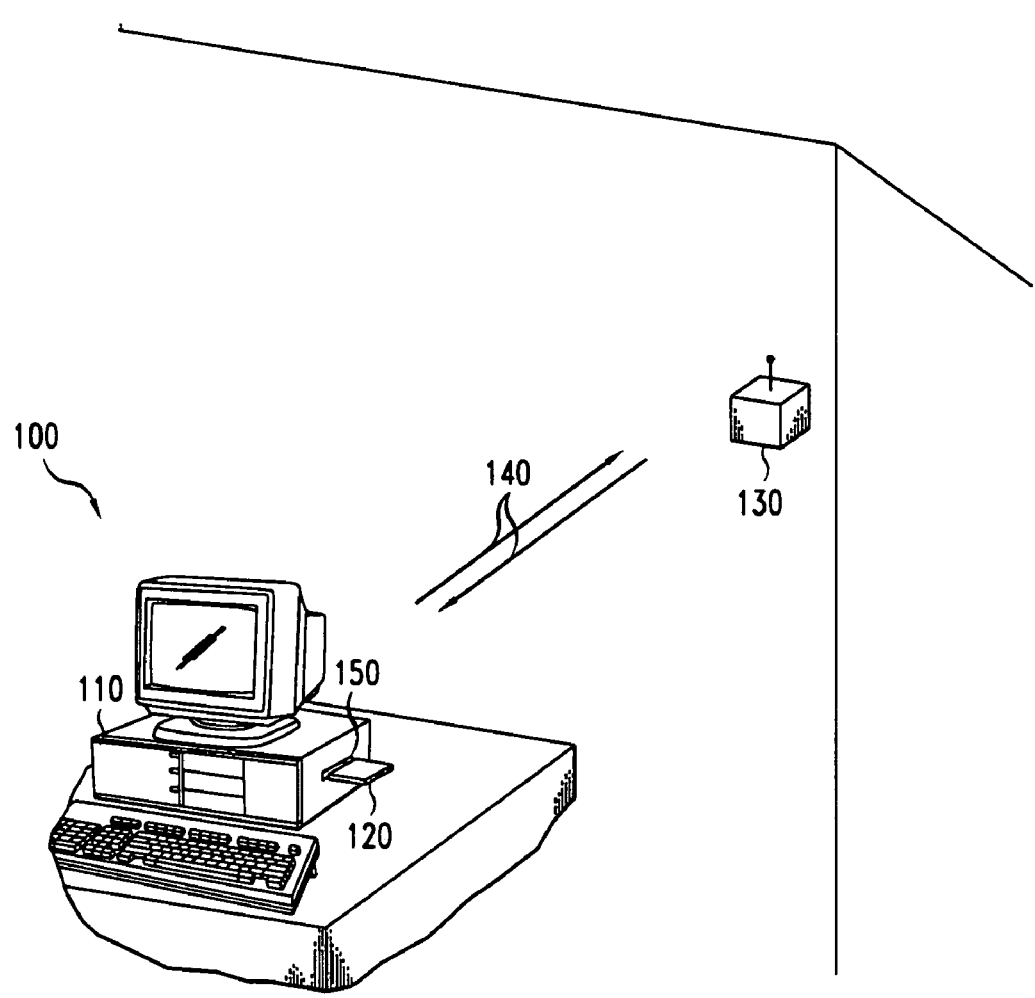
FIG. 1 illustrates a computer communication system embodying the principles of the present invention.

FIG. 1 illustrates system 100, in accordance with the present invention. System 100 communicates over an over-the-air channel 140 with base station 130 of a computer network. The computer network can be any type of computer network, such as a wide area network or a local area network (LAN).

Figure 2:
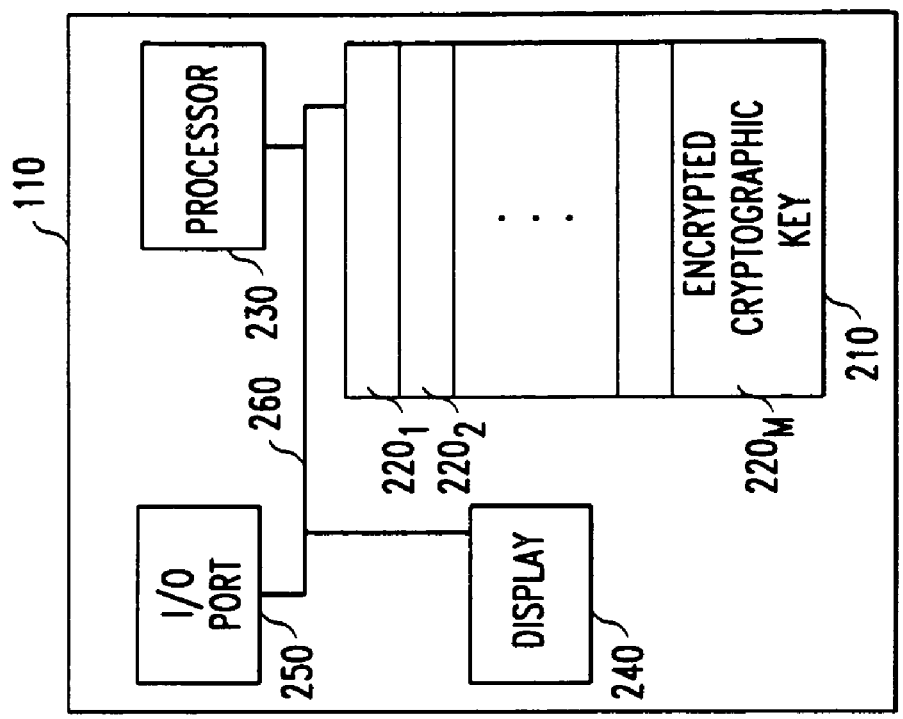
FIG. 2 illustrates the details of the computer used in the system of FIG. 1.

More particularly system 100 includes computer 110 that communicates with base station 130. As shown in FIG. 2, computer 110 includes display 240, I/O port 250, a controller, such as processor 230, that controls the operation of the computer, and a memory, such as hard disk drive 210, containing memory locations $220_1$, $220_2$, ... $220_M$, for storing information, such as software, and data. Computer 110 also includes buses 260 that connect each of these elements of computer 110 to some or all of the other elements of computer 110. Computer 110 also contains other elements, not shown, useful in the operation of computer 110.

Figure 3:
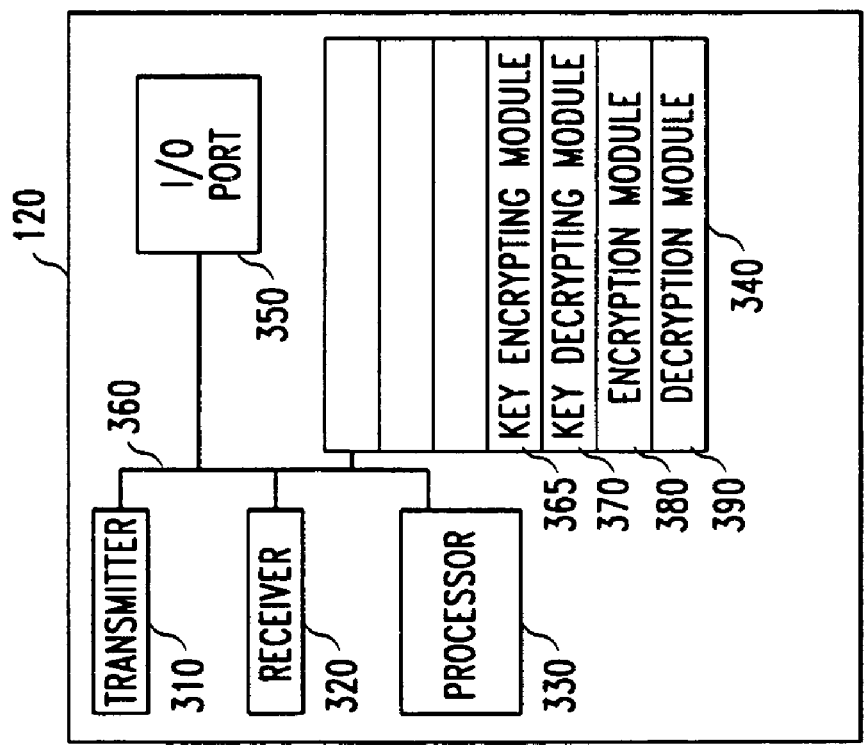
FIG. 3 illustrates the details of a network access card installed in the computer of FIGS. 1 and 2.

Computer 110's I/O port 250 interfaces with network access card 120's I/O port 350 (shown in FIG. 3). The network access card should be the type of card that can be used to access the particular type of network with which system 100 wishes to communicate. For example, when the network is a LAN the network access card can be a WAVE-LAN Gold PC card, or an ORINOCO Gold PC card, both currently manufactured by Lucent Technologies.

As can be seen in FIG. 1, network access card 120 is inserted into slot 150 of computer 110 and forms part of system 100. Computer 110 uses network access card 120 to communicate with base station 130. To this end, as shown in FIG. 3, network access card 120 includes a transmitter 310 for transmitting information to base station 130, and receiver 320 for receiving information from base station 130. Network access card 120 also includes memory 340, for storing information such as software and data, and a controller, such as processor 330, that controls the operation of network access card 120. Network access card 120 may also include other elements, not shown, useful in the operation of network access card 120. Each of the elements in network access card 120 is coupled to some or all of its other elements via buses 360.

Security of communications in the computer network is achieved by encrypting the communications between computer 110 and the network using a cryptographic key. As explained above, it is advantageous for the cryptographic key to be stored in transformed format, such as for example in encrypted form, within computer 110. Illustratively, the encrypted cryptographic key is stored in memory location $220_M$ of hard disk drive 210. Obviously, the encrypted cryptographic key needs to be decrypted before it is used to encrypt a communication, so the information and algorithm needed to decrypt the encrypted cryptographic key, referred to herein as the key re-transforming information, must be stored somewhere within system 100. As noted above, there is a problem with most conventional ways of storing the key re-transforming information within system 100. A sufficiently knowledgeable and motivated user might be able to discover the encrypted cryptographic key and the key re-transforming information and to know how to use the latter to recover the original cryptographic key. Or the user might simply be able to monitor internal operations of the equipment in such a way as to "pick off" the original cryptographic key once it has been decrypted and is in use within the system.

In accordance with the invention, security of the cryptographic key is enhanced beyond that provided by known arrangements by storing the key re-transforming information in a device, referred to herein as a "decryption store" which is separate from the device in which the encrypted cryptographic key is stored, referred to herein as an "cryptographic key store." In the present illustrative embodiment of the invention, the cryptographic key store is hard disk drive 210 of computer 110 and the decryption store is network access card 120. System 100 also contains accessing circuitry such as a controller, which in the present illustrative embodiment is processor 230, that is able to access the encrypted cryptographic key from hard disk drive 210. Decryption of the encrypted cryptographic key is carried out in network access card 120, as is the subsequent encryption using the decrypted cryptographic key. Processor 230 communicates with the decryption store exclusively via a predetermined interface. The interface being such that processor 230 is unable to access from the decryption store at least one of: a) at least a portion of the key re-transforming information, and b) at least a portion of the cryptographic key, and preferably, the processor is unable to access either of them. The portion of the key re-transforming information and the portion of the cryptographic key that is inaccessible should be large enough to prevent someone from being able to obtain the entire cryptographic key from the encrypted cryptographic key. (In some embodiments of the invention the entire cryptographic key may be inaccessible and/or the entire key re-transforming information may be inaccessible.)

Thus, the encrypted cryptographic key can be stored relatively insecurely on hard disk drive 210—thereby allowing it to be readily changed—while the security of the cryptographic key itself is maintained at a very high level because there is no native capability for computer 110 to randomly read information from network access card 120.

Figure 4:
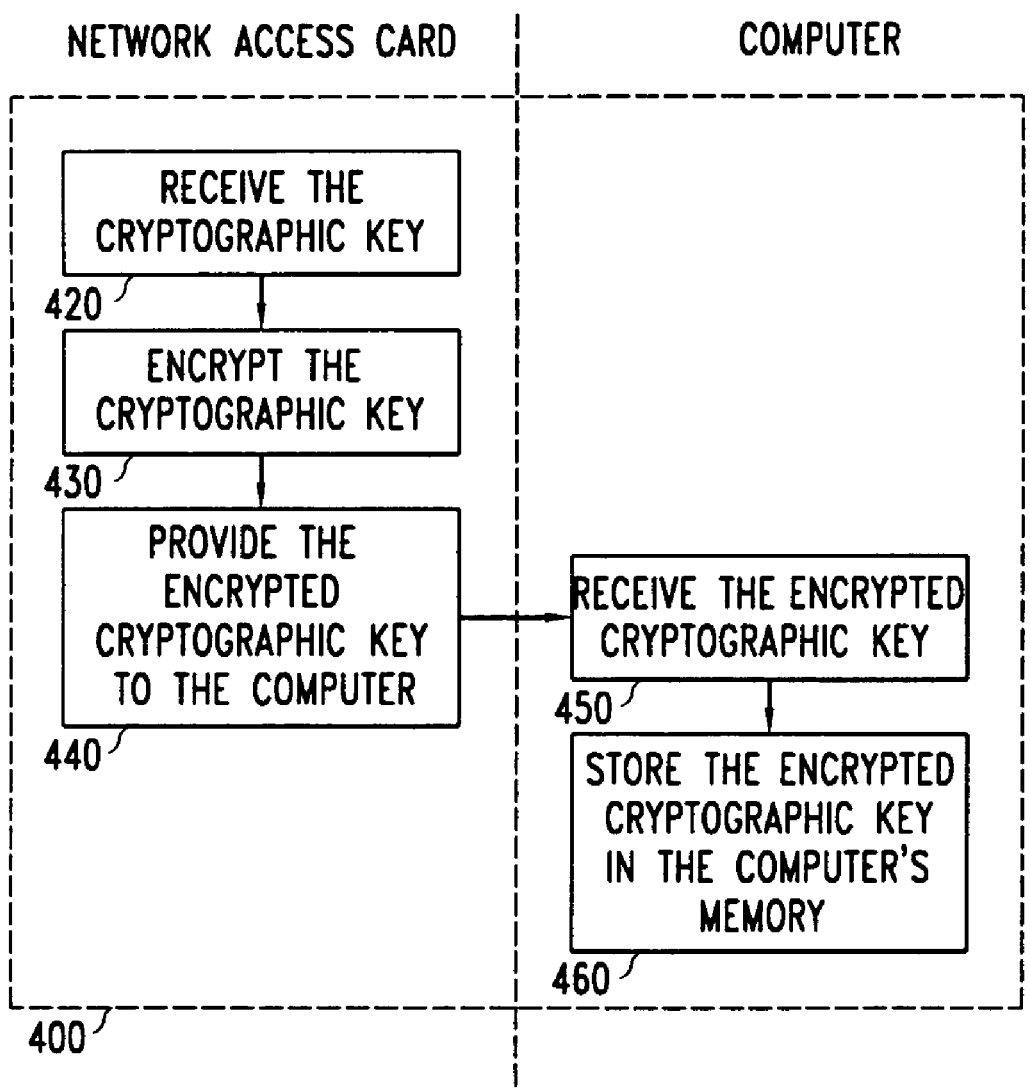
FIG. 4 is a flowchart illustrating a key load process of the system of FIG. 1.
Figure 5:
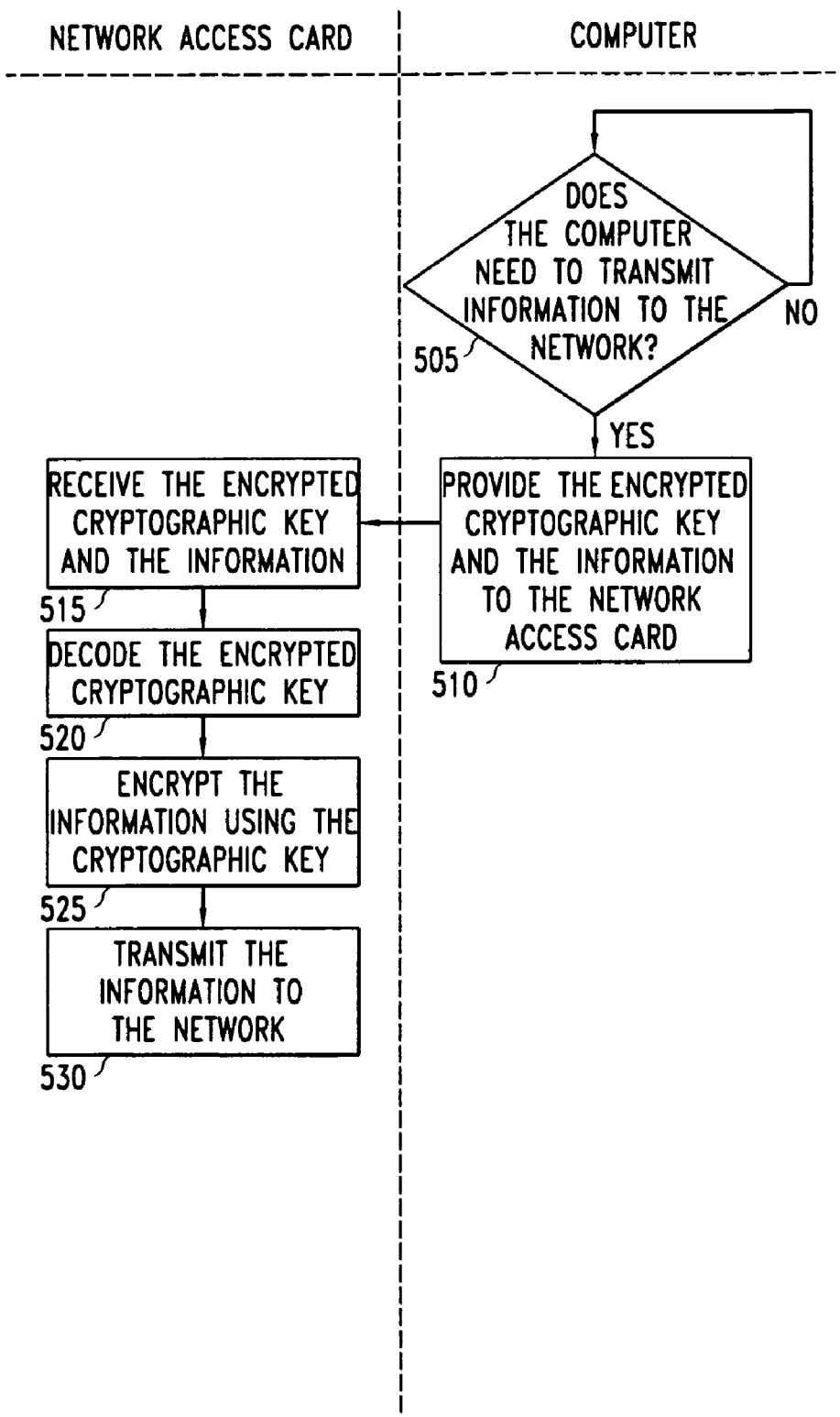
FIG. 5 is a flowchart illustrating aspects of the operation of the system of FIG. 1 when the system transmits information to the network.
Figure 6:
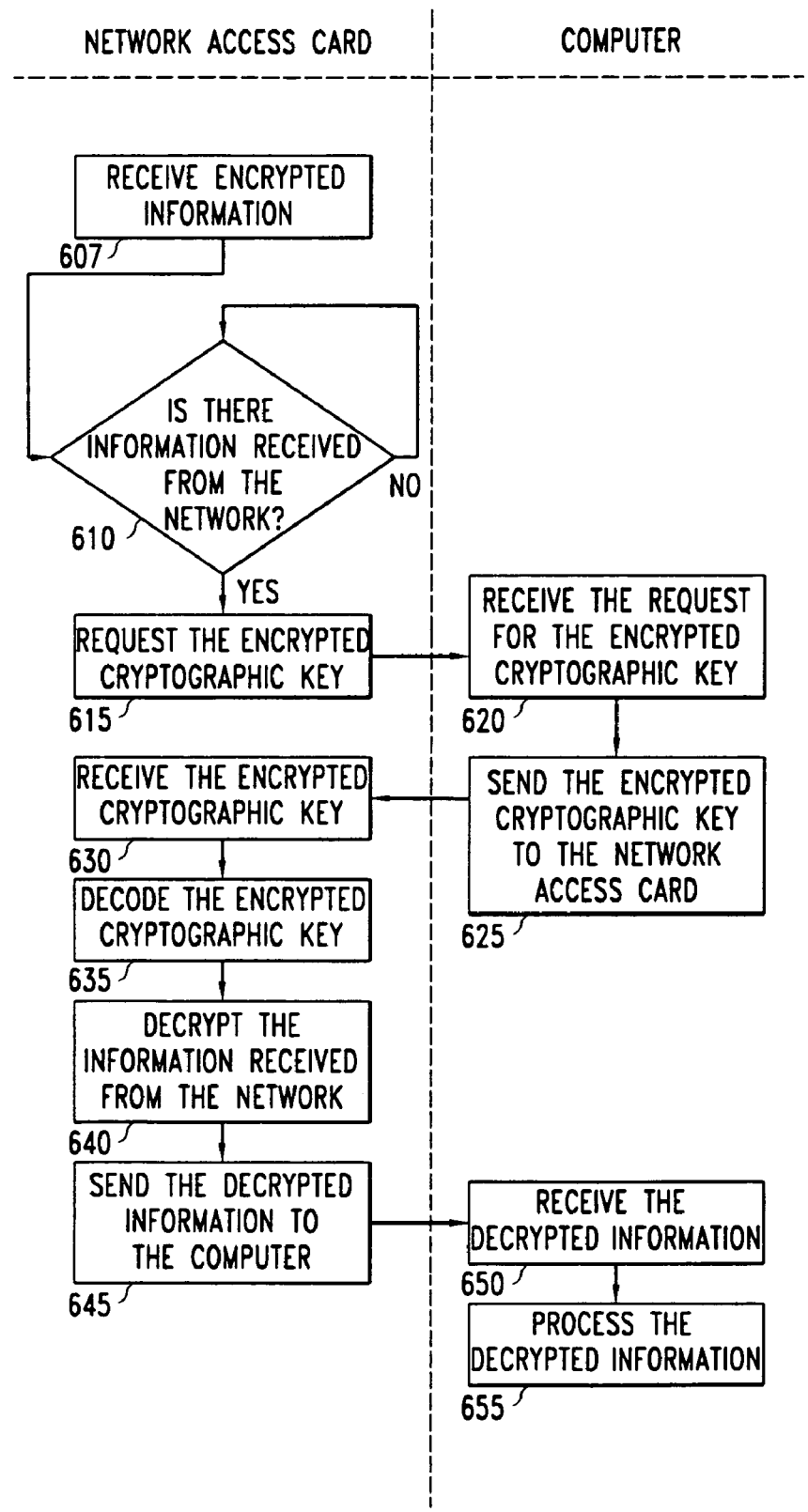
FIG. 6 is a flowchart illustrating aspects of the operation of the system of FIG. 1 when the system receives information from the network.

FIGS. 4, 5, and 6 show an illustrative flow of the process of aspects of the operation of system 100. The individual boxes in the flowcharts of FIGS. 4, 5, and 6 are described as process steps. However, those boxes can be equally understood as representing program instructions stored in a memory of system 100 and executed by a processor of system 100 to effectuate the respective process steps.

An illustrative key load process 400 is now described with reference to FIGS. 1, 2, 3 and 4. The cryptographic key is loaded onto network access card 120. For example, the cryptographic key can be loaded onto the network access card when the card is first manufactured, or a network administrator can load the cryptographic key onto the card from a disk at a later time.

The cryptographic key is received by network access card 120, step 420, and sent via bus 360 to processor 330, which then, in step 430, runs key encrypting module 365 stored in memory 340. Key encrypting module 365 uses key transforming information, such as a key encrypting algorithm and a transformation pattern, both stored in memory 340. The key encrypting algorithm can be any algorithm, such as for example a "one-way function" (one-way permutation), such as a so-called block encoder. The block encoder is a non-reversible function, i.e. it does not allow the decryption of the encrypted cryptographic key without the transformation pattern. It is advantageous in this environment to avoid techniques that may make the encrypted cryptographic key susceptible to being decrypted without knowing the transformation pattern.

Key encrypting module 365 uses this key encrypting algorithm and the transformation pattern to encrypt the cryptographic key as a function of the transformation pattern and so produce the encrypted cryptographic key. Thus, the encrypted cryptographic key is a function of the transformation pattern. The transformation pattern can be any set of bits that can be generated or selected in any manner. For increased security the transformation pattern is preferably a secret transformation pattern, i.e. it is not known outside of the network access card. For example, the transformation pattern can be randomly generated by the network access card. Alternatively, the transformation pattern can be a unique identifier of network access card 120, i.e. that is any set of bits unique to network access card 120. Some examples of such unique identifier network access card 120's serial number or its Medium Access Control (MAC) address—a unique address assigned to the network access card. Although, again preferably, the unique identifier is either secret, i.e. it is not known outside of the network access card, or not easily obtainable.

This transformation pattern, or another transformation pattern which can be used to decrypt the cryptographic key encrypted with this transformation pattern, becomes part of the key re-transforming information, i.e. the information needed to decrypt the now encrypted cryptographic key. As described above, in addition to the transformation pattern the key re-transforming information includes the other information needed to decrypt the encrypted cryptographic key, such as, for example, a key-decrypting algorithm.

The key transforming and key re-transforming information can be provided to network access card 120 in any manner. For example, the information can be built into network access card 120, or loaded onto network access card 120. The two types of information, transforming and re-transforming, can be provided to network access card 120 in either the same or in different manners. Furthermore, portions of each type of key re-transforming information can be provided to the network access cards through different means. For example, the key encrypting and key decrypting algorithms can be loaded onto the network access card when it is manufactured and the rest of the information can be loaded from a disk when the network access card is put into operation.

The interface for I/O port 350 is designed so that it does not allow access to at least a portion of the key re-transforming information on the network access card, and so that it does not allow access to a least a portion of the cryptographic key while is it being used by the network access card. Preferably, the interface is also designed so that it does not allow access to at least a portion of the key transforming information on the network access card. Designing the interface in this manner can include not allowing I/O port 350 to address some or all of memory 340, buses 360, and processor 330 that respectively store, transport, and process the cryptographic key and the decryption and key transforming information. Thus, a user would not be able to monitor internal operations of network access card 120 in such a way as to "pick off" the original cryptographic key once it has been decrypted and is in use; nor would the user be able to discover the encrypted cryptographic key and the key re-transforming and/or key transforming information and to use the latter to recover the original cryptographic key.

After the cryptographic key is encrypted, then, in step 440, network access card 120's I/O port 350 provides the encrypted cryptographic key to computer 110's I/O port 250. I/O port 250 receives the encrypted cryptographic key, step 450, and sends it via bus 260 to memory 210 for storage, step 460. It is in this way that network access card 120 sends the encrypted cryptographic key to memory 210 where the encrypted cryptographic key is stored for a period of time.

The same cryptographic key can be provided to multiple systems, or the cryptographic key provided to system 100 may be a unique key. Additionally, system 100 may use multiple cryptographic keys, either concurrently or interchangeably. Key load process 400 can be used to load all or some of the cryptographic keys used by system 100. Additionally key load process 400 can be used to load both the initial and the replacement cryptographic keys. In the latter case, once the replacement cryptographic key is encrypted it can be stored in the same memory location as its corresponding previous encrypted cryptographic key, in which case the replacement key will override the previous key. Alternatively, the replacement key can be stored in a different memory location and the previous key is then erased. A different transformation pattern can be generated or selected for each distinct cryptographic key, i.e. each new cryptographic key and each replacement cryptographic key. Alternatively one transformation pattern can be used to encrypt multiple cryptographic keys, by for example, generating or selecting one transformation pattern and storing it on the network access card.

Once computer 110 has the encrypted cryptographic key in memory 210, it can communicate with the network. Computer 110 needs to communicate with the network when computer 110 needs to transmit information to the network. The information can be any type of information, such as data, voice, or control information. Some examples of the latter include a request to access a file, software, or a network peripheral. Illustrative aspects of the operation of system 100 when computer 110 needs to transmit information to the network are now described with reference to FIGS. 1, 2, 3 and 5.

Periodically, computer 110 checks if it needs to transmit information to the network, step 505. If the answer is NO, then the computer waits and checks again later. If the answer is YES, then, in step 510, computer 110's processor 230 directs the encrypted cryptographic key and the information that is to be transmitted via bus 260 to I/O port 250, which in turn provides them to network access card 120's I/O port 350. I/O port 350 receives them, step 515, and sends them via bus 360 to processor 330, which runs key decrypting module 370 stored in memory 340, step 520. Key decrypting module 370 uses the key re-transforming information to decrypt the encrypted cryptographic key using the key re-transforming information to produce the cryptographic key. Processor 330 then runs encryption module 380 stored in memory 340, step 525. Encryption module 380 uses the now decrypted cryptographic key to encrypt the information to produce encrypted information. In order to enhance the security of the encrypted information, the encryption module may also introduce an additional element of variability by, for example, adding the well-known technique of encrypting the information as a function of a so-called cryptosync or cryptographic synchronizer. In this technique, a value that is readily ascertainable by system 100 and the network, for example a so-called packet number, is used in addition to the cryptographic key to encrypt one portion, for example, a so-called packet, of the information, such that each packet is encrypted using the cryptographic key and the value associated with the packet.

The network access card then transmits the encrypted information to base station 130 via transmitter 310, step 530. The network receives the encrypted information, via base station 130, and then decrypts and processes this information.

The above paragraph describes the operation of the system when computer 110 needs to transmit something to the network. Additionally, computer 110 needs to communicate with the network when the network transmits information to computer 110. Illustrative aspects of the operation of system 100 when computer 110 receives information from the network are now described with reference to FIGS. 1, 2, 3 and 6.

The network transmits information, via base station 130, to network access card 120, which receives the information via receiver 320, step 607. Network access card 120 periodically checks if it has received encrypted information from the network, step 610. If the answer is NO, then the network access card waits and checks again later. If the answer is YES, then, in step 615, network access card 120's processor 330 sends a request through its I/O port 350 requesting the encrypted cryptographic key. Computer 110's I/O port 250 receives the request, step 620, which it forwards via bus 260 to processor 230. Processor 230 directs the encrypted cryptographic key to be provided via I/O 250 to I/O port 350, step 625. I/O port 350 receives the encrypted cryptographic key, step 630, and sends it via bus 360 to processor 330. Processor 330 then runs key decrypting module 370, step 630, which uses the key re-transforming information to decrypt the encrypted cryptographic key. Thereafter, processor 330 runs decryption module 390 also stored in memory 340, step 640. Decryption module 390 uses the now decrypted cryptographic key (and any other necessary information such as the above-described cryptosync) to decrypt the received information and thereby produce decrypted information. The network access card then sends the decrypted information via I/O port 350 to computer 110, step 645. Computer 110's I/O port 250 receives the decrypted information, step 650, and sends it via bus 260 to processor 230, where the information is processed, step 655.

Optionally, the security of system 100 can be further increased by erasing the unencrypted cryptographic key from the network access card. For example, the cryptographic key can be erased from the network access card at the completion of each cryptographic operation—an encrypting or decrypting operation—where "completion" means that all of the information provided to the network access card in steps 515 or 607 has been either encrypted or decrypted. Alternatively, the cryptographic key can be stored in the network access card in such a way that it disappears from the network access card when network access card is removed from system 100. In the former case network access card 120 would receive the encrypted cryptographic key before each cryptographic operation; and in the later case network access card 120 would receive the encrypted cryptographic key at least before the first cryptographic operation after the network access card is inserted into system 100.

The operation of system 100 has been described above with the cryptographic key loaded using key load process 400 where the key is encrypted by the network access card using its transformation pattern. This process provides the advantages of added security in that 1) only the particular network card can decrypt the encrypted cryptographic key and 2) the particular network card can only decrypt the encrypted cryptographic keys that were encrypted as a function of its transformation pattern.

However, key load process 400 is optional. In alternative embodiments of the invention the unencrypted cryptographic key is not encrypted in the network access card and then passed to computer 110. Rather, the cryptographic key is encrypted elsewhere and the cryptographic key in its encrypted form is provided to computer 110, for example, by being loaded onto computer 110 from a disk by the network administrator. In this case, the key re-transforming information has to be provided to the network access card. The key re-transforming information can be provided to the network access card in any manner, such as, for example, it can be built into or loaded onto network access card 120.

The foregoing is merely illustrative and various alternatives will now be discussed. In the illustrative embodiments the encrypted cryptographic key is decrypted to produce the cryptographic key. In alternative embodiments of the invention any transformation, referred to herein as a re-transformation, may be used to transform the encrypted cryptographic key to produce the cryptographic key. The re-transformation may be any process that changes the encrypted cryptographic key to obtain the cryptographic key. For example the re-transformation may include any of the following, either alone or in any combination: decryption, decoding, masking, combining, permuting, and rearranging.

Additionally, any transformation may be used to transform the cryptographic key to produce the encrypted cryptographic key. This transformation may be any process that changes the cryptographic key such as, for example, any, or any combination of: encryption, encoding, masking, combining, permuting, and rearranging.

In the illustrative embodiment the cryptographic key is encrypted as a function of the transformation pattern, which may be a unique identifier of the network access card. In alternative embodiments, the cryptographic key can be encrypted with an identifier of a different piece of equipment, such as, for example, an identifier of computer 110.

In other alternative embodiments, rather than encrypt the cryptographic key with a transformation pattern associated with the network access card, the cryptographic key can be encrypted with a general transformation pattern, which is a transformation pattern used by many, or even all, other systems that communicate with the network.

In the illustrative embodiment the cryptographic key is encrypted as a function of the transformation pattern. In alternative embodiments the encrypted cryptographic key can be a function of other information in addition to the transformation pattern. This other information can be provided in any known manner, such, as for example, by building it into network access card 120, loading it onto network access card 120 from a source other than the network, or downloading it from the network to the network access card. (In the last case, the download can be made more secure from unauthorized eavesdropping by using well-known techniques such as public key based key exchange or special tunneling.)

In the illustrative embodiment the cryptographic key is encrypted as a function of the transformation pattern. In alternative embodiments, the cryptographic key can be combined with other information before it is encrypted using the transformation pattern to produce the encrypted cryptographic key. The cryptographic key can be combined with the other information in any manner, for example by concatenating the cryptographic key and the other information, or by concatenating the key and the other information and then permuting the result. In such embodiments, when the encrypted cryptographic key is decrypted the result would be the combination on the cryptographic key and the other information. This combination would then be processed to obtain the cryptographic key. The other information can be any information that is provided to the network access card in any manner. For example, the other information may be a set of bits that is randomly generated by the network access card.

In the examples shown in the illustrative embodiment the decryption and key transforming information is built into network access card 120, or loaded onto network access card 120 from a source other than the network. However, as described above, the decryption and key transforming information can be provided to the network access card in any manner. For example, there may be some applications where it may be advantageous to configure the network access card to accept either or both the decryption and key transforming information in a download from the network, even though typically this is not as secure as the other above described methods of providing the information. (Similarly to the above downloads, this download can be made more secure from unauthorized eavesdropping by using well-known techniques such as public key based key exchange or special tunneling.)

In the illustrative embodiment, the cryptographic key is loaded onto the network access card, either when the card is first manufactured or at a later time. However, the cryptographic key can be provided in any manner and at any time, such as, for example, the network, of which base station 130 is a part, can download the cryptographic key to system 100 via base station 130. (This download can be made more secure from unauthorized eavesdropping in any manner, such as, for example, by using such well known techniques as public key based key exchange or special tunneling.)

Additionally, in the cases where the cryptographic key is provided to the network access card from a source other than the network, then optionally, system 100 may then provide the cryptographic key to the network, preferably in a secure transmission.

The illustrative embodiment is described with I/O port 350 being one I/O port. However, one skilled in the art will realize that the I/O port can be implemented as multiple I/O ports, in which case the interface is designed so that none of the I/O ports allow access to the cryptographic key, at least a portion of the key re-transforming information, and, optionally, at least a portion of the key transforming information. (Similarly, I/O port 250 may also be implemented as multiple I/O ports.) Furthermore, the I/O ports can be implemented as separate input and output ports.

In the illustrative embodiment the computer memory that stores the encrypted cryptographic key is hard drive 210. However, in alternative embodiments the computer memory does not have to include any mechanical components typically included in a hard drive. The computer memory can be any type of computer memory.

The illustrative embodiment is described with key encrypting module 365, key decrypting module 370, encryption module 380, and decryption module 390 implemented as software stored in memory 340. However, in alternative embodiments each of these blocks can be implemented with some, or all of the modules implemented in hardware. In that case each module can be implemented as distinct circuitry, or all or some of the modules implemented in one circuit.

The illustrative embodiment is described with the decryption store including key encrypting module 365, key decrypting module 370, encryption module 380, and decryption module 390. However, in alternative embodiments the decryption store can include fewer than all of these modules. For example, the decryption store can include just key decrypting module 370 and encryption module 380.

In the illustrative embodiment, the network access card receives and decrypts the encrypted cryptographic key before each cryptographic operation, steps 515 and 520, and 615, 630 and 635. However, the network access card can receive and decrypt the encrypted cryptographic key either periodically, or, as described above in the optional process, the network access card can receive and decrypt the encrypted cryptographic key at least when the network access card is inserted into the system.

Figure 7:
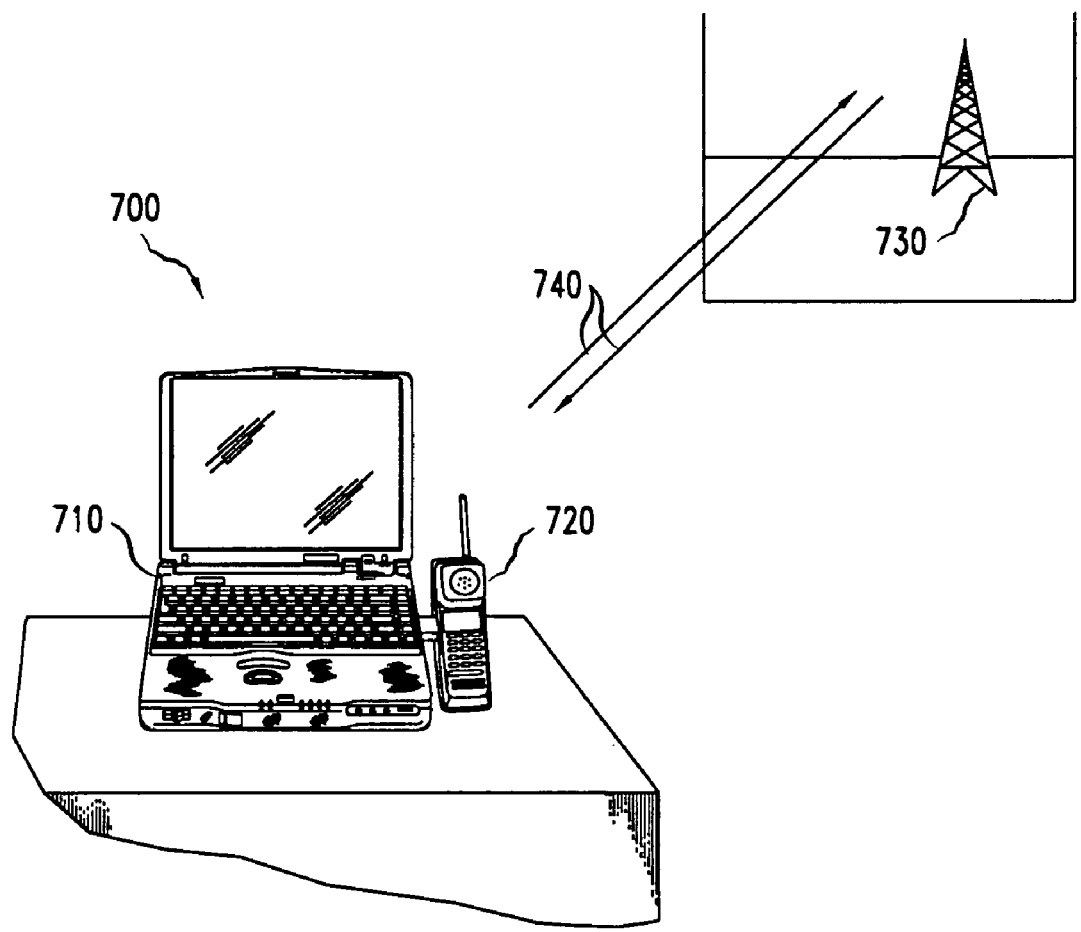
FIG. 7 illustrates another system embodying the principles of the present invention; in this embodiment the computer communicates with a wireless communication system via a mobile terminal.

In the illustrative embodiment the network is a computer network. In alternative embodiments of the invention, the network can be any type of network, in which case the network access equipment, which in the illustrative embodiment was network access card 120, is any network access equipment that can access the particular type of network. For example, FIG. 7 shows one alternative embodiment of system 700 in accordance with an illustrative embodiment of the present invention where computer 710 communicates over channel 740 with base station 730 of a wireless communications network. In this case, the network access equipment is mobile terminal 720, which computer 710 uses to communicate with base station 730.

In the illustrative embodiments of FIGS. 1 and 7 the decryption store is the network access equipment, i.e. network access card 120 and mobile terminal 720, respectively. In alternative embodiments of the invention, the decryption store can be any device that is separate from, i.e. communicates via an interface with, the device in which the cryptographic key is stored and where the interface does not allow access to at least one of a) at least a portion of the key re-transforming information, and b) at least a portion of the cryptographic key. Optionally, the interface also does not allow access to at least a portion of the key transforming information.

In the illustrative embodiments of FIGS. 1 and 7 the system communicates with the network over an over-the-air interface. In alternative embodiments, the interface can be any interface.

In the illustrative embodiment the cryptographic key is used to both encrypt the information from the computer to the network and decrypt the information from the network to the computer. In alternative embodiments one cryptographic key can be used to encrypt the information and another cryptographic key can be used to decrypt the information, and either or both keys can be transformed using the key encryption and key decryption information and either or both keys can be stored in accordance with the invention.

In the illustrative embodiment of the entire cryptographic key is used to produce the encrypted cryptographic key. In alternative of the invention, only a portion of the cryptographic key is used. (The other portion of the cryptographic key may be stored in any manner or processed and then stored in any manner.)

Thus, while the invention has been described with reference to a preferred embodiment, it will be understood by those skilled in the art having reference to the specification and drawings that various modifications and alternatives are possible therein without departing from the spirit and scope of the invention.

We claim:

1. A method for use in a system which includes a cryptographic key store for storing a transformed cryptographic key and accessing circuitry for accessing the transformed cryptographic key from the cryptographic key store, the method comprising the step of:
    storing key re-transforming information for the transformed cryptographic key in a decryption store, the accessing circuitry communicating with the decryption store via an address-limited port that includes an interface, the interface preventing the port from addressing at least portions of at least one of: a) key re-transforming information, and b) a cryptographic key;
    wherein said key re-transforming information comprises a randomly generated transformation pattern.

2. The method of claim 1 wherein the interface further prevents the port from addressing at least portions of both the key re-transforming information, and the cryptographic key.

3. The method of claim 1 wherein the key re-transforming information further comprises a key decrypting algorithm.

4. The method of claim 3 wherein the transformation pattern comprises a unique identifier of the decryption store.

5. The method of claim 1 further comprising the steps of:
    the decryption store receiving the cryptographic key;
    the decryption store transforming the cryptographic key using key transforming information to produce the transformed cryptographic key; and
    the decryption store sending the transformed cryptographic key to the cryptographic key store.

6. The method of claim 1 wherein:
    the decryption store comprises a mobile terminal;
    the cryptographic key store comprises a computer memory; and the accessing circuitry comprises a processor.

7. The method of claim 1 wherein:
    the decryption store comprises a network access card;
    the cryptographic key store comprises a computer memory; and the accessing circuitry comprises a processor.

8. The method of claim 1 further comprising the steps of:
    the decryption store receiving the transformed cryptographic key and information;
    the decryption store re-transforming the transformed cryptographic key using the key re-transforming information to produce the cryptographic key; and the decryption store encrypting the information using the cryptographic key to produce encrypted information.

9. The method of claim 8 further comprising the step of transmitting the encrypted information.

10. The method of claim 1 further comprising the steps of:
    the decryption store receiving encrypted information;
    the decryption store receiving the transformed cryptographic key;
    the decryption store re-transforming the transformed cryptographic key using key re-transforming information to produce the cryptographic key; and
    the decryption store decrypting the encrypted information using the cryptographic key to produce decrypted information.

11. The method of claim 10 further comprising the step of the accessing circuitry accessing the decrypted information.

12. The method of claim 1 wherein the accessing circuitry's communication with the decryption store comprises the transfer of information between them.

13. The method of claim 1 wherein the storing step comprises storing the transformed cryptographic key in the cryptographic key store for a period of time.

14. The method of claim 1 further comprising the step of erasing the cryptographic key from the decryption store at the completion of each cryptographic operation.

15. The method of claim 1 wherein the cryptographic key is stored in the decryption store in such a way that it disappears from the decryption store when the decryption store is removed from the system.

16. A decryption store for storing key re-transforming information for a transformed cryptographic key, the decryption store comprising:
    an address-limited output port, including an interface that prevents the port from addressing at least portions of at least one of stored key-re-transforming information and a cryptographic key, for receiving the transformed cryptographic key
    wherein the information is accessible from the decryption store through the output port
    and said information comprises a randomly generated transformation pattern.

17. The decryption store of claim 16 wherein said interface further prevents the port from addressing at least portions of both: a) the key re-transforming information, and b) the cryptographic key.

18. The decryption store of claim 16 wherein the decryption store comprises a mobile terminal.

19. The decryption store of claim 16 wherein the decryption store comprises a network access card.

20. The decryption store of claim 16 wherein the decryption store further comprises:
    a key decrypting module for decrypting the transformed cryptographic key using the key re-transforming information to produce the cryptographic key;
    an encrypting module for encrypting information using the cryptographic key to produce encrypted information; and
    a decrypting module for decrypting encrypted information.

21. The decryption store of claim 20 wherein the decryption store further comprises a transmitter for transmitting the encrypted information.

22. The decryption store of claim 16 wherein the decryption store further comprises:
    a receiver for receiving the cryptographic key; and
    a key encrypting module for encrypting the cryptographic key using key transforming information to produce the transformed cryptographic key.

23. The decryption store of claim 22 wherein the transformed cryptographic key is a function of a transformation pattern.

24. The decryption store of claim 23 wherein the transformation pattern comprises a unique identifier of the decryption store.

25. A system comprising:
a cryptographic key store for storing a transformed cryptographic key;
accessing circuitry for accessing the transformed cryptographic key from the cryptographic key store;
a decryption store for storing key re-transforming information for the transformed cryptographic key,
wherein the accessing circuitry communicates with the decryption store via an address-limited output port that includes an interface, the interface preventing the port from addressing at least portions of at least one of: a) key re-transforming information, and b) a cryptographic key;
wherein said key re-transforming information comprises a randomly generated transformation pattern.

26. The system of claim 25 wherein the decryption store comprises a mobile terminal, the cryptographic key store comprises a computer memory, and the accessing circuitry comprises a processor.

27. The system of claim 25 wherein
the decryption store comprises a network access card,
the cryptographic key store comprises a computer memory, and the accessing circuitry comprises a processor.

28. The system of claim 25 wherein the decryption store further comprises:
an input port for receiving the transformed cryptographic key;
a key decrypting module for decrypting the transformed cryptographic key using the key re-transforming information to produce the cryptographic key;
an encrypting module for encrypting information using the cryptographic key to produce encrypted information.

29. The system of claim 28 wherein the decryption store further comprises a transmitter for transmitting the encrypted information.

30. The system of claim 25 wherein the decryption store further comprises:
an input port for receiving the transformed cryptographic key;
a key decrypting module for decrypting the transformed cryptographic key using the key re-transforming information to produce the cryptographic key;
a decrypting module for decrypting encrypted information.

31. The system of claim 30 wherein the decryption store further comprises a receiver for receiving the encrypted information.

32. The system of claim 25 wherein the decryption store further comprises:
a receiver for receiving the cryptographic key;
a key encrypting module for encrypting the cryptographic key using key transforming information to produce the transformed cryptographic key; and wherein the output port outputs the transformed cryptographic key.

33. The method of claim 25 wherein the interface further prevents the port from addressing at least portions of both the key re-transforming information and the cryptographic key.

34. A method for storing key re-transforming information for a transformed cryptographic key, the method comprising:
receiving the transformed cryptographic key; and
preventing an address-limited output port, including a predetermined interface, from addressing at least portions of at least one of stored key-re-transforming information and an encryptographic key,
wherein said key re-transforming information comprises a randomly generated transformation pattern.

35. The method of claim 34 wherein the key retransforming information comprises a key decrypting algorithm.

36. The method of claim 35 wherein the transformation pattern comprises a unique identifier of the decryption store.

37. The method of claim 34 further comprising the steps of:
the decryption store receiving the cryptographic key;
the decryption store transforming the cryptographic key using key transforming information to produce the transformed cryptographic key; and
the decryption store sending the transformed cryptographic key to a cryptographic key store via the output port.

38. The method of claim 34 wherein the decryption store comprises a mobile terminal.

39. The method of claim 34 wherein the decryption store comprises a network access card.

40. The method of claim 34 further comprising the steps of:
the decryption store receiving information; and
the decryption store encrypting the information using the cryptographic key to produce encrypted information.

41. The method of claim 40 further comprising the step of transmitting the encrypted information.

42. The method of claim 34 further comprising the steps of:
the decryption store receiving encrypted information, and decrypting the information using the cryptographic key to produce decrypted information.

43. The method of claim 42 further comprising the step of sending the decrypted information to accessing circuitry via the output port.

44. The method of claim 34 further comprising preventing the port from addressing at least portions of both the key re-transforming information and the cryptographic key.

* * * * *